Figure 1:
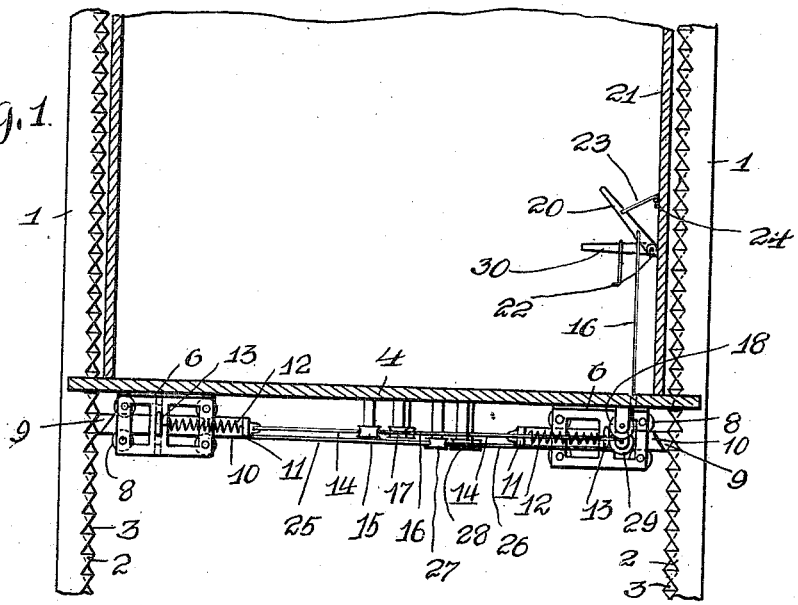

A. NÉMETH.
ELEVATOR SAFETY DEVICE.
APPLICATION FILED NOV. 10, 1910.

983,079.

Patented Jan. 31, 1911.

WITNESSES

INVENTOR
A. NÉMETH,
by
Attorneys.

UNITED STATES PATENT OFFICE.

ALEXANDER NÉMETH, OF SOUTH BEND, INDIANA.

ELEVATOR SAFETY DEVICE.

983,079.  Specification of Letters Patent.  Patented Jan. 31, 1911.

Application filed November 10, 1910. Serial No. 591,703.

*To all whom it may concern:*

Be it known that I, ALEXANDER NÉMETH, a subject of the King of Hungary, residing at South Bend, in the county of St. Joseph and State of Indiana, have invented certain new and useful Improvements in Elevator Safety Devices, of which the following is a specification, reference being had therein to the accompanying drawing.

This invention relates to an elevator safety device, and the invention has for its primary object to provide means in a manner as will be hereinafter set forth for preventing an accidental and rapid descent or ascent of an elevator cage or platform.

Another object of this invention is to provide a safety device that can be advantageously used for stopping an elevator cage when the hoisting cables thereof break or when the engine employed for operating the cage runs away, these accidents often resulting in the loss of life and the destruction of property, and I aim to obviate such accidents by a locking mechanism that can be easily and quickly actuated to stop and release an elevator cage.

A still further object of the invention is to accomplish the above results by a mechanism that is simple and durable, applicable to various types of elevator cages, and efficient as a safety device.

With the above and such other objects in view as may hereinafter appear the invention consists of the novel construction, combination, and arrangement of parts to be hereinafter specifically described and then claimed.

Figure 2:
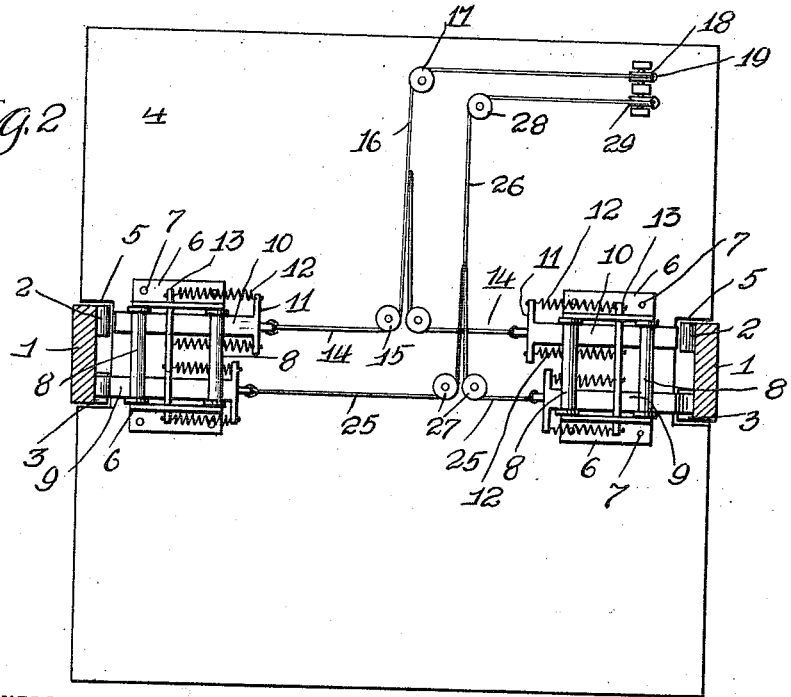

Reference will now be had to the drawing, wherein:

Figure 1 is a vertical sectional view of an elevator cage provided with the safety device, and Fig. 2 is a bottom plan of the same.

1 denotes the side and guide rails of an elevator shaft, these rails having the confronting faces thereof provided with two racks 2 and 3, the teeth of the rack 2 being arranged the reverse of the teeth of the rack 3, the rack 2 preventing a sudden descent of the elevator cage and the rack 3 a sudden ascent thereof, as will hereinafter appear.

4 denotes the bottom or floor of an elevator cage, which is cut-away, as at 5, to provide clearance for the side and guide rails 1. The floor 4 is provided with sets of depending bearings 6, said bearings being riveted or otherwise secured to the floor 4, as at 7, with the sets 6 confronting the rails 1. Revolubly mounted in each set of bearings are guide rollers 8 supporting gripping bars 9 and 10, the gripping bars 10 being used in connection with the racks 2 and the gripping bars 9 in connection with the racks 3. The bars 9 and 10 have the outer ends provided with teeth to engage the teeth of the racks 3 and 2 and the inner ends with cross heads 11, said cross heads being connected by retractile springs 12 to a cross bar 13 arranged in each set of bearings, said cross bar being cutaway or provided with openings to clear the gripping bars 9 and 10.

The cross heads 11 of the gripping bars 10 are connected to branch cables 14 passing over revoluble sheaves 15 carried by the floor 4 of the elevator cage, said branch cables being connected to a main cable 16 that passes around a revoluble sheave 17 under another sheave 18 and upwardly through a hole 19 provided therefor in the floor 4 of the cage. The sheaves 17 and 18 are supported by the bottom of the floor 4, and the end of the cable 16 is attached to a lever 20 pivotally connected to the side wall 21 of the cage, as at 22, said lever being held in an elevated position by a hook 23 engaging in a staple 24, carried by the side of the cage.

The cross heads 11 and the gripping bars 9 are connected by branch cables 25 to a main cable 26, said branch cables passing over sheaves 27 and the main cable 26 over sheaves 28 and 29, all of said sheaves being supported from the bottom of the cage floor 4. The cable 26 is connected to a pivoted lever 30 similar to the lever 20, the lever 30 being shown in a released position and the lever 20 in a locked position.

With the levers in a locked position the retractile springs 12 are retained under tension, whereby when the levers are released, the gripping bars 9 and 10 will be immediately shifted into engagement with their respective racks, thereby preventing a sudden descent or ascent of the elevator cage.

It is thought that the operation and utility of the safety device will be apparent without further description, and while in the drawings there is illustrated a preferred embodiment of the invention, it is to be understood that the structural elements thereof are susceptible to such changes as fall within the scope of the appended claim.

What I claim, is:

In an elevator safety device, the combination with oppositely disposed guide rails, each guide rail having two racks with the teeth of one rack the reverse of the teeth of the other rack, and a cage adapted to slide between said rails, of depending bearings carried by said cage, anti-friction guide rollers journaled in said bearings, gripping bars movably mounted between said guide rollers and adapted to engage said racks, sheaves carried by the bottom of said cage, cables connected to the inner ends of said bars and passing over said sheaves and upwardly through the bottom of said cage, levers pivotally connected to the inner side of said cage and to the ends of said cables, means including retractile springs adapted to shift said gripping bars into engagement with said racks, and means including hooks adapted to normally hold said levers in an elevated position with said springs under tension, substantially as and for the purpose herein described.

In testimony whereof I affix my signature in the presence of two witnesses.

ALEX. NÉMETH.

Witnesses:
 ALEX. X. SÓCRIH,
 CHAS. G. ABRAHAM.